(12) United States Patent
Kimura

(10) Patent No.: US 10,823,962 B2
(45) Date of Patent: Nov. 3, 2020

(54) PROCESSING DEVICE HAVING CONNECTION DETECTOR, DISPLAY SYSTEM, AND NON-TRANSITORY COMPUTER-READABLE STORAGE MEDIUM

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/229,546

(22) Filed: Dec. 21, 2018

(65) Prior Publication Data

US 2019/0196185 A1    Jun. 27, 2019

(30) Foreign Application Priority Data

Dec. 22, 2017    (JP) .................. 2017-246914

(51) Int. Cl.
```
G06F 3/14        (2006.01)
G02B 27/01       (2006.01)
G09G 5/00        (2006.01)
G09G 3/3225      (2016.01)
G09G 3/00        (2006.01)
```

(52) U.S. Cl.
CPC ..... *G02B 27/0101* (2013.01); *G02B 27/0172* (2013.01); *G06F 3/1454* (2013.01); *G09G 3/001* (2013.01); *G09G 3/3225* (2013.01); *G09G 5/003* (2013.01); *G02B 2027/014* (2013.01); *G02B 2027/0178* (2013.01); *G09G 2320/0626* (2013.01); *G09G 2330/022* (2013.01)

(58) Field of Classification Search
CPC .... G02B 2027/0132; G02B 2027/0138; G02B 2027/014; G02B 2027/0178; G02B 27/0101; G02B 27/0172; G06F 3/1454; G09G 2320/0626; G09G 2330/022; G09G 3/001; G09G 3/3225; G09G 5/003
See application file for complete search history.

(56) References Cited

U.S. PATENT DOCUMENTS

2005/0145774 A1 * 7/2005 Yang ............. G06F 1/3203
                                                  250/205
2013/0002701 A1   1/2013 Ida
(Continued)

FOREIGN PATENT DOCUMENTS

JP    2012-044429 A    3/2012
JP    2013-092781 A    5/2013
(Continued)

*Primary Examiner* — Ram A Mistry
(74) *Attorney, Agent, or Firm* — Oliff PLC

(57) ABSTRACT

A processing device as a personal digital assistant includes a display unit configured to display an image, a connection detector configured to detect that an external display device has been connected, an image output unit configured to output an image displayed on the display unit to the display device in response to the connection of the display device, and a user interface output unit configured to switch an image displayed on the display unit to display of a user interface for instructing execution of processing related to the image output to the display device at a predetermined brightness value in response to the connection of the display device.

13 Claims, 8 Drawing Sheets

(56) References Cited

U.S. PATENT DOCUMENTS

| | | | |
|---|---|---|---|
| 2013/0141453 A1* | 6/2013 | Devara | G09G 5/10 |
| | | | 345/589 |
| 2014/0139439 A1* | 5/2014 | Park | G06F 3/04886 |
| | | | 345/169 |
| 2015/0061974 A1 | 3/2015 | Kobayashi | |

FOREIGN PATENT DOCUMENTS

| | | |
|---|---|---|
| JP | 2013-093705 A | 5/2013 |
| JP | 2015-049883 A | 3/2015 |
| JP | 2016-506530 A | 3/2016 |

* cited by examiner

PROCESSING DEVICE HAVING CONNECTION DETECTOR, DISPLAY SYSTEM, AND NON-TRANSITORY COMPUTER-READABLE STORAGE MEDIUM

BACKGROUND

1. Technical Field

The invention relates to a processing device capable of operating in cooperation with a display device, a display system including the processing device and the display device, and a program executed in the processing device.

2. Related Art

Head-mounted display devices (head-mounted displays (HMDs)) as display devices used to be worn by a user on a head have been known. More various services are considered to be provided by operating such an HMD in cooperation with multifunctional personal digital assistant such as a smartphone.

For example, the personal digital assistant generally has a mirroring function of causing an external display device to display an image and video displayed on the personal digital assistant. This mirroring function is used to display a display image of the personal digital assistant on, for example, a transmission HMD, such that a user can conveniently see the display image of the personal digital assistant within a visual field while capturing an actual object located in an environment in the visual field.

However, when a display image of the personal digital assistant is simply displayed on the HMD by a known mirroring function, video reproduced and displayed on the personal digital assistant, for example, continues to be displayed unnecessarily on the personal digital assistant even after being displayed on the HMD. At this time, a user interface (hereinafter also referred to as a UI) necessary for an operation (such as fast-forwarding and pausing) related to the video continues to be displayed as a small image in such a way that does not interfere with the video, for example. In a case of a so-called transmission HMD, a user sees a UI on the personal digital assistant through video displayed on the HMD, which results in a decrease in the visibility of the UI. As a result, while the video is displayed on the HMD to be easily seen, operability of the UI on the personal digital assistant may decrease and convenience and usefulness of mirroring an image to the HMD may decrease.

Therefore, there is room for improvement in respect of usability in cooperative operation between a known HMD and a personal digital assistant of causing an image on the personal digital assistant to be displayed on the HMD by using the mirroring function.

As a related known technology, JP-A-2015-49883 describes that icons displayed on an external device are rearranged and displayed on a transmission HMD, and the icons are operable from the HMD.

As another known technology, JP-A-2016-506530 describes that a user interface for input of personal information displayed on a personal digital assistant is displayed on an HMD while the input personal information is not displayed on the personal digital assistant.

However, the known technologies do not provide solutions to the problem of improvement in the usability of cooperative operation between the HMD and the personal digital assistant by using the mirroring function of the personal digital assistant.

SUMMARY

An advantage of some aspects of the invention is to improve usability of cooperative operation between a processing device such as a personal digital assistant and a display device such as an HMD by using a mirroring function.

To solve the problem described above, a processing device in the invention includes a display unit configured to display an image, a connection detector configured to detect that an external display device has been connected, an image output unit configured to output an image displayed on the display unit to the display device in response to the connection of the display device, and a user interface output unit configured to switch an image displayed on the display unit to display of a user interface for instructing execution of processing related to the image output to the display device at a predetermined brightness value in response to the connection of the display device.

This configuration allows an input operation of a user to be facilitated by, for example, enlarging and displaying a user interface on the processing device when an image is displayed on the display device. As a result, the usability of cooperative operation between the processing device and the display device is improved in terms of operability.

According to an aspect of the invention, the user interface output unit sets brightness of the display unit to a value smaller than the predetermined brightness value or to zero when the user interface displayed on the display unit has not been operated for a predetermined period of time or longer.

This configuration can reduce power consumption of the processing device by reducing power consumed in the display unit when the user interface displayed on the display unit does not need to be operated and a user does not need to visually recognize the display unit. As a result, the usability of cooperative operation between the processing device and the display device is also improved in terms of operation cost.

According to an aspect of the invention, an acceleration sensor is further provided, and the user interface output unit sets brightness of the display unit to the predetermined brightness value when shake of the processing device has been detected by detecting a change in an acceleration of the processing device acquired from the acceleration sensor at intervals in a predetermined range, at an amplitude having a predetermined value or greater, and/or for the number of times greater than or equal to a predetermined number of times.

According to this configuration, a user can cause the user interface on the display unit to be brightly displayed by shaking the processing device when the display brightness of the display unit is set to be low and the user interface is hardly visually recognized. As a result, the usability of cooperative operation between the processing device and the display device is further improved in terms of operability.

According to an aspect of the invention, an attitude sensor is further provided, and the user interface output unit sets brightness of the display unit to the predetermined brightness value when it has been detected that the display unit of the processing device is directed in a direction opposite to a gravitational direction.

According to this configuration, a user can cause the user interface on the display unit to be brightly displayed by directing the display unit in an opposite "upward" direction to a gravitational direction when the display brightness of the display unit is set to be low and the user interface is hardly visually recognized. As a result, the usability of cooperative operation between the processing device and the display device is further improved in terms of operability.

According to an aspect of the invention, the user interface output unit causes the display unit to display selection operation elements for a user to select any of a plurality of predetermined user interfaces in response to the connection of the display device, and switches an image displayed on the display unit to one corresponding user interface in response to an operation on the selection operation elements.

According to this configuration, a user can cause the display unit of the processing device to display an appropriate user interface according to an image displayed on the display device. As a result, the usability of cooperative operation between the processing device and the display device is further improved in terms of operability.

According to an aspect of the invention, a display size instructing unit configured to provide an instruction of a display resolution of the image output to the head-mounted display device to the image output unit is further provided.

This configuration can display an image having an aspect ratio suitable for the display device on the display device, and thus usage efficiency of a display region in the display device can be improved. As a result, the usability of cooperative operation between the processing device and the display device may also be improved in terms of an amount of information that may be provided to a user.

According to an aspect of the invention, an arithmetic unit is provided, and the user interface output unit is achieved by execution of a first application program in the arithmetic unit.

This configuration can easily improve the usability of cooperative operation between the processing device and the display device by simply executing an application program without rebuilding an operating system.

According to an aspect of the invention, the image output to the display device is generated by execution of a second application program in the arithmetic unit, and the user interface output unit acquires information about a type of the second application program from the second application program, and switches an image displayed on the display unit to display of the user interface according to the type of the second application program.

According to this configuration, the processing device causes the display unit to automatically display an appropriate user interface according to an image displayed on the display device, and thus the usability of cooperative operation between the processing device and the display device is further improved in terms of operability.

According to an aspect of the invention, the arithmetic unit executes the first application program and the second application program on an operating system, and the user interface output unit inputs, to the second application program via the operating system, input information being input from a user via the user interface.

According to this configuration, the user interface output unit can appropriately pass information about a user operation on the user interface displayed on the display unit to a program that provides an image output to the display device without specifying a destination to which the information is delivered. This suppresses an increase in processing load on the arithmetic unit due to the user interface output unit, and the usability of cooperative operation between the processing device and the display device is improved in terms of smoothness.

According to an aspect of the invention, the display device includes a display region in which an external scene is visually recognizable, superimposes the image on an external scene and displays the image in front of a line of sight of the user in the display region when the display device is worn by the user on a head, and includes a camera configured to capture an external scene. The user interface output unit sets display brightness of the display unit to a value smaller than the predetermined brightness value or to zero when the display unit is determined not to fall within a visual field range of the user, based on a captured image of an external scene acquired from the camera provided in the display device.

This configuration can avoid unnecessary power consumption of the processing device by reducing brightness of the display unit when the display unit does not fall within a visual field range of the user and thus the user interface on the display unit is less likely to be operated. As a result, the usability of cooperative operation between the HMD and the processing device can be improved in terms of operation cost.

According to an aspect of the invention, the user interface output unit sets brightness of an image output to the display unit to the predetermined brightness value when the display unit is determined to fall within a visual field range of the user, based on a captured image of an external scene acquired from the camera provided in the display device.

This configuration can cause the user interface on the display unit to be easily visually recognized by increasing a brightness value of the user interface on the display unit when the display unit falls within the visual field range of the user and thus the user interface on the display unit is more likely to be operated. As a result, the usability of cooperative operation between the HMD and the processing device can be improved in terms of operability.

According to an aspect of the invention, the image output unit sets brightness of the image output to the display device to be lower than brightness when the display unit is determined not to fall within a visual field range of the user or to zero when the display unit is determined to fall within a visual field range of the user, based on a captured image of an external scene acquired from the camera provided in the display device.

According to this configuration, brightness of an image superimposed on a screen of the display unit as an external scene and displayed is reduced in the display device when the display unit falls within the visual field range of the user and thus the user interface on the display unit is more likely to be operated. As a result, the usability of cooperative operation between the HMD and the processing device can be improved in terms of operability by further increasing the visibility of the user interface on the display unit.

To solve the problem described above, the invention is a display system including any processing device described above and a display device that includes a display region in which an external scene is visually recognizable and superimposes the image on an external scene and displays the image in front of a line of sight of the user in the display region when the display device is worn by the user on a head.

This configuration can achieve the display system that may particularly improve the usability of cooperative operation between the HMD and the processing device.

To solve the problem described above, the invention is a program executed by an arithmetic unit of a processing device including a display unit configured to display an image, a connection detector configured to detect that an external display device has been connected, an image output unit configured to output an image displayed on the display unit to the display device in response to the connection of the display device, and the arithmetic unit, the program causing the arithmetic unit to function as a user interface output unit configured to switch an image displayed on the display unit to display of a user interface for instructing execution of processing related to the image at a predetermined brightness value in response to the connection of the display device.

This configuration can facilitate an input operation of a user by, for example, enlarging and displaying a user interface on the processing device when an image is displayed on the display device. As a result, the usability of cooperative operation between the processing device and the display device is improved in terms of operability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
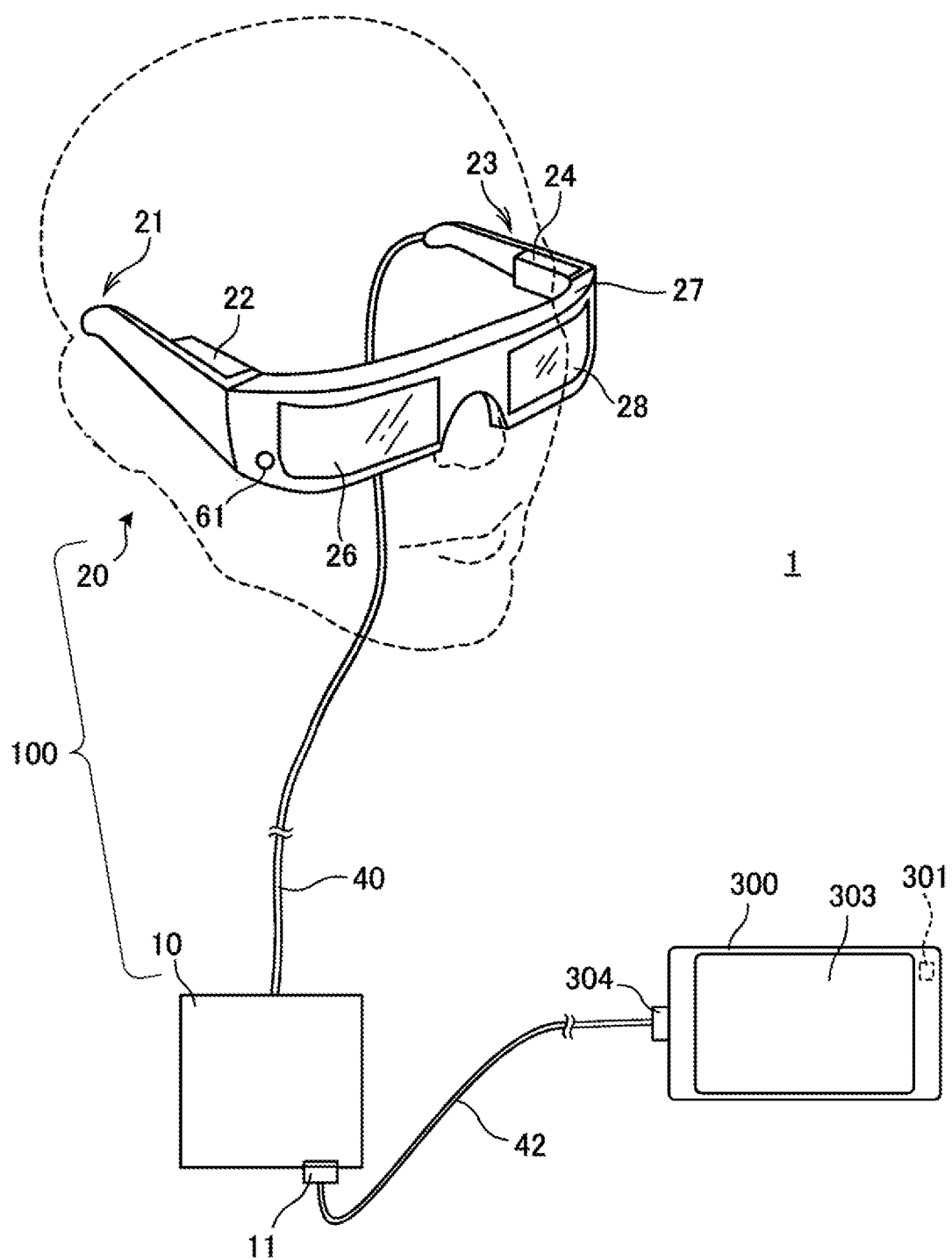
FIG. 1 illustrates an external view of an HMD and a personal digital assistant constituting a display system according to one exemplary embodiment of the invention.

FIG. 1 is a diagram illustrating a configuration of a display system 1 according to an exemplary embodiment to which the invention is applied.

The display system 1 includes a personal digital assistant 300 as a processing device and a head-mounted display (HMD) 100 as an external display device for the personal digital assistant 300.

The HMD 100 is a display device that includes a display region in which an external scene is visually recognizable and generates an image in front of a line of sight of a user in the display region when the HMD 100 is worn by the user on a head.

An image display unit 20 is a head-mounted body to be worn by the user on the head and has an eyeglasses-like shape in the exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from ends of the front frame 27, respectively, to hold the image display unit 20 to the head of the user in a manner similar to the temples of a pair of eyeglasses.

The right display unit 22 and the left display unit 24 are formed of an organic light emitting diode (OLED) that emits light by an organic electro luminescence, for example, and respectively output image light for right eye of the user and image light for left eye.

The right light-guiding plate 26 and the left light-guiding plate 28 are, for example, a prism. The right light-guiding plate 26 allows passage of external light and guides the external light to the right eye of the user, and also guides right image light from the right display unit 22 provided on the right holding part 21 to the right eye of the user to cause the right eye to visually recognize an image. The left light-guiding plate 28 allows passage of external light and guides the external light to the left eye of the user, and also guides left image light from the left display unit 24 provided on the left holding part 23 to the left eye of the user to cause the left eye to visually recognize an image.

In this way, the image display unit 20 allows the user to visually recognize an external scene, and also displays an image by causing the user to visually recognize a virtual image with the image light of the right display unit 22 and the left display unit 24.

The image display unit 20 further includes a camera 61 disposed on the right display unit 22. The camera 61 acquires an image of an environment in a visual recognition range of the user according to a direction of the image display unit 20 through, for example, a hole provided in the front frame 27 of the image display unit 20. The camera 61 is a digital camera equipped with an imaging lens and an imaging element, such as a charge-coupled device (CCD) or a complementary metal oxide semiconductor (CMOS), for example.

The image display unit 20 is connected to a connection device 10 via a connection cable 40. The connection device 10 includes a connector 11 in a box-shaped case (also referred to as a casing or a main body) and is connected to the personal digital assistant 300 via the connector 11. The connection device 10 receives an image output from the personal digital assistant 300 via the connector 11, controls the right display unit 22 and the left display unit 24 of the image display unit 20, and displays the received image for the user. Further, the connection device 10 transmits image data from the camera 61 to the personal digital assistant 300 via the connector 11.

The connector 11 of the connection device 10 is, for example, a Universal Serial Bus (USB) connector.

The personal digital assistant 300 includes a nine-axis sensor 301 configured to detect a direction and movement of the personal digital assistant 300, a display unit 303 configured to display an image, and a connector 304.

The connector 304 of the personal digital assistant 300 is, for example, a Universal Serial Bus (USB) connector. The connector 304 and the connector 11 are connected to each other via a communication cable 42 as a USB cable, for example.

The personal digital assistant 300 as the processing device is, for example, a smartphone in the exemplary embodiment.

However, the personal digital assistant 300 may be a portable computer such as a tablet computer and a notebook computer.

Figure 2:
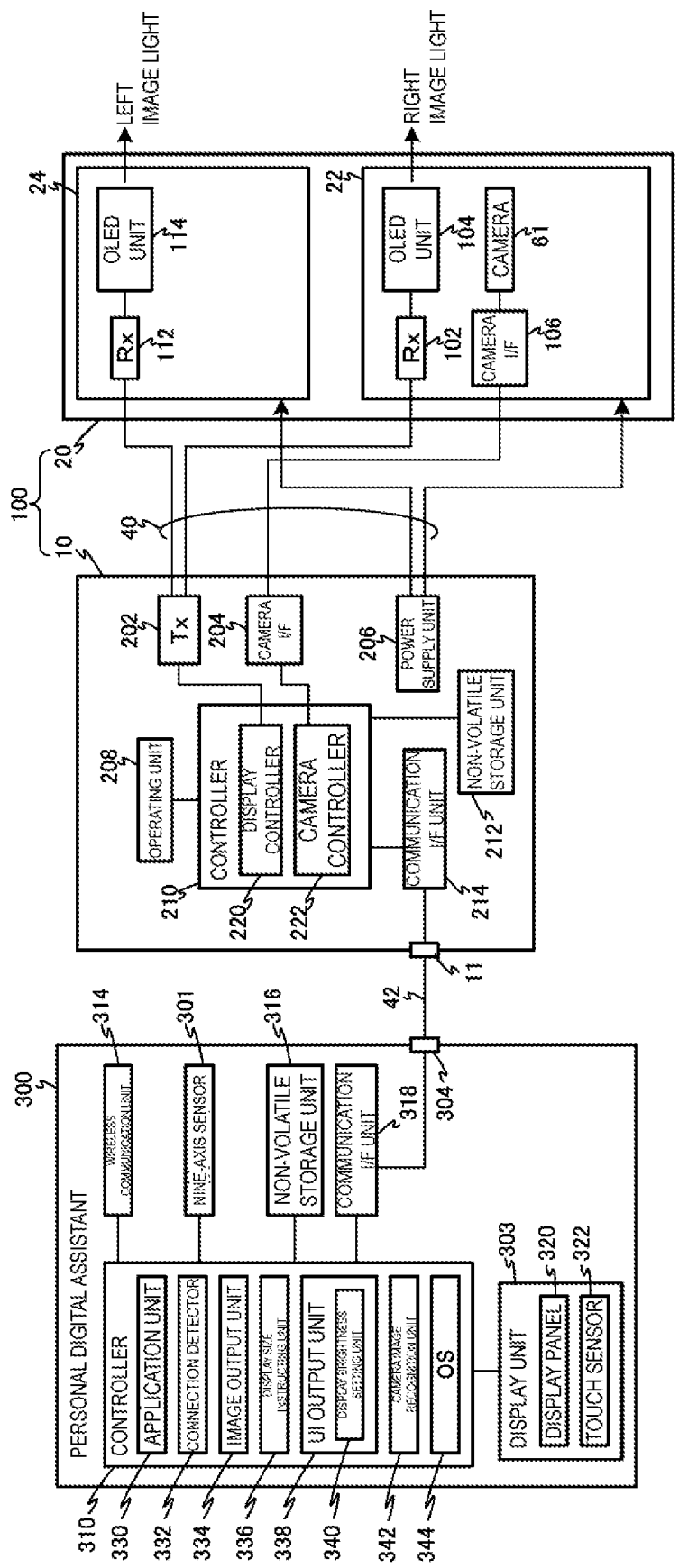
FIG. 2 is a diagram illustrating a configuration of the HMD and the personal digital assistant.

FIG. 2 is a diagram illustrating a configuration of the HMD 100 and the personal digital assistant 300 constituting the display system 1. As described above, the HMD 100 includes the connection device 10 and the image display unit 20 connected to each other via the communication cable 40.

The right display unit 22 of the image display unit 20 includes a reception unit (Rx) 102, an OLED unit 104, and a camera interface (I/F) 106 in addition to the camera 61. The Rx 102 receives a right image signal as an image signal for right eye from the connection device 10 and outputs the right image signal to the OLED unit 104. The OLED unit 104 is formed of, for example, an OLED (not illustrated) and a drive circuit (not illustrated) that drives the OLED. The OLED unit 104 outputs right image light toward the right light-guiding plate 26 based on the received right image signal. Further, the camera I/F 106 receives a control signal for the camera 61 transmitted from the connection device 10, and also transmits an image signal from the camera 61 to the connection device 10.

The left display unit 24 of the image display unit 20 includes a reception unit (Rx) 112 and an OLED unit 114. The reception unit (Rx) 112 receives a left image signal as an image signal for left eye from the connection device 10 and outputs the left image signal to the OLED unit 114. The OLED unit 114 is formed of, for example, an OLED (not illustrated) and a drive circuit (not illustrated) that drives the OLED, similarly to the OLED unit 104. The OLED unit 114 outputs left image light toward the left light-guiding plate 28 based on the received left image signal.

Each of the components of the image display unit 20 operates with power supplied from a power supply unit 206 of the connection device 10 via the connection cable 40. The image display unit 20 may include a power supply circuit (not illustrated) configured to distribute a power supply input from the power supply unit 206 and convert voltage.

The connection device 10 includes a transmission unit (Tx) 202, a camera I/F 204, the power supply unit 206, an operating unit 208, a controller 210, a non-volatile storage unit 212, and a communication interface (I/F) unit 214. The Tx 202 transmits the right image signal and the left image signal output from the controller 210 to the Rx 102 and the Rx 112 of the image display unit 20, respectively.

The non-volatile storage unit 212 is a storage device that stores data and the like processed by the controller 210 in a non-volatile manner. The non-volatile storage unit 212 is, for example, a magnetic recording device such as a hard disk drive (HDD) or a storage device using a semiconductor storage element, such as a flash memory.

The communication I/F unit 214 performs wired communication with the personal digital assistant 300 in conformity with USB communication standards, for example, in the exemplary embodiment.

The power supply unit 206 supplies power to the image display unit 20 and each of the components of the connection device 10 based on power supplied from the personal digital assistant 300 via the communication cable 42 as the USB cable, for example, and the communication I/F unit 214 that are connected to the connector 11 in the exemplary embodiment. The power supply unit 206 may incorporate a voltage conversion circuit (not illustrated) and be able to supply different voltages to each of the components of the connection device 10 and the image display unit 20. Further, the power supply unit 206 may be formed of a logic circuit or a device such as an FPGA. Note that, the power supply unit 206 may not have the above-described configuration, and may supply power to the image display unit 20 and each of the components of the connection device 10 based on power from a chargeable battery (not illustrated) provided in the connection device 10 instead of power supplied from the personal digital assistant 300.

The operating unit 208 includes a button and a switch being operable by a user and used to input instructions and data to the controller 210.

The controller 210 is a computer including a processor such as a central processing unit (CPU), for example. The controller 210 may include a read only memory (ROM) to which a program is written and a random access memory (RAM) used to store data temporarily. The controller 210 includes a display controller 220 and a camera controller 222 as functional elements (or functional units).

The functional elements provided in the controller 210 are achieved by execution of a program by the controller 210 as a computer, for example. Note that, the above-described computer program may be stored in any computer-readable storage medium.

Instead, the whole or a part of the above-described functional elements provided in the controller 210 may also be formed by hardware each including one or more electronic circuit components. The hardware may be programmed hardware such as a digital signal processor (DSP) and a field programmable gate array (FPGA).

The display controller 220 receives image data from the personal digital assistant 300 via the communication I/F unit 214, and generates a right image signal and a left image signal to perform display for the image display unit 20. Further, the display controller 220 transmits the generated right image signal and left image signal to the Rx 102 and the Rx 112 of the image display unit 20 via the Tx 202, respectively. In this way, an image output from the personal digital assistant 300 is displayed on the image display unit 20 for the user.

The camera controller 222 acquires an image captured by the camera 61 via the camera I/F 204. Further, the camera controller 222 transmits image data about the image acquired from the camera 61 to the personal digital assistant 300 via the communication I/F unit 214.

The personal digital assistant 300 includes the nine-axis sensor 301, the display unit 303, a controller 310, a wireless communication unit 314, a non-volatile storage unit 316, and a communication interface (I/F) unit 318.

The display unit 303 includes a display panel 320 and a touch sensor 322. The display panel 320 is, for example, a liquid crystal display panel. The touch sensor 322 is, for example, a touch panel. The display unit 303 displays a user interface (UI) such as a button on the display panel 320 and operates in cooperation with the touch sensor 322 to acquire an input from a user in addition to displaying an image on the display panel 320.

The nine-axis sensor 301 corresponds to an acceleration sensor and an attitude sensor. The nine-axis sensor 301 detects an acceleration (three axes), an angular velocity (three axes), and a geomagnetic field (three axes) of a casing of the personal digital assistant 300, and detects a direction (attitude) and movement of the personal digital assistant 300. The nine-axis sensor 301 is formed of, for example, a three-axis acceleration sensor and a three-axis gyro (angular velocity) sensor as a motion sensor (inertial sensor) and a magnetic sensor as a three-axis geomagnetic sensor.

The wireless communication unit 314 is a wireless transmitter-receiver. The controller 310 accesses an Internet network via the wireless communication unit 314, and acquires various pieces of information including image information from various servers constituting the World Wide Web.

The communication I/F unit 318 performs wired communication with the communication I/F unit 214 of the connection device 10 in conformity with USB communication standards, for example, in the exemplary embodiment. However, communication between the wireless I/F unit 318 and the communication I/F unit 214 is not limited to wired communication in conformity with USB communication standards, and may be performed in conformity with other various communication standards including wired and wireless communication standards.

The non-volatile storage unit 316 stores, in a non-volatile manner, programs to be executed by the controller 310 and data to be processed by the controller 310. The non-volatile storage unit 316 is, for example, a magnetic recording device such as an HDD or a storage device using a semiconductor storage element, such as a flash memory.

The non-volatile storage unit 316 stores an operating system (OS) as a basic control program to be executed by the controller 310 and an application program operating on the OS as a platform. The non-volatile storage unit 316 also stores data to be processed during execution of an application program and data about a processing result.

The controller 310 serves as an arithmetic unit, includes a processor (not illustrated), such as a central processing unit (CPU) and a microcomputer, and controls each of the components of the personal digital assistant 300 by execution of a program by the processor. The controller 310 may include a read only memory (ROM) configured to store in a non-volatile manner a control program executed by the processor and a random access memory (RAM) constituting a work area of the processor.

The controller 310 includes, as functional elements (or functional units), an application unit 330, a connection detector 332, an image output unit 334, a display size instructing unit 336, and a user interface (UI) output unit 338. The controller 310 further includes a camera image recognition unit 342 and an operating system (OS) 344. The UI output unit 338 further includes a display brightness setting unit 340 as a functional element.

The functional elements provided in the controller 310 are achieved by execution of a program by the controller 310 as a computer. Note that, the above-described computer program may be stored in the non-volatile storage unit 316 or stored in any computer-readable storage medium.

The connection detector 332, the image output unit 334, the display size instructing unit 336, the UI output unit 338, the display brightness setting unit 340, and the camera image recognition unit 342 are achieved by execution of a first application program by the controller 310. The first application program is stored in, for example, the non-volatile storage unit 316.

However, the invention is not limited to this, and the UI output unit 338 may be achieved as a part of the OS 344 instead of being achieved by the first application program.

The application unit 330 is achieved by execution of a second application program by the controller 310, and performs any predefined processing such as processing of displaying a moving image (namely, video) and a still image on the display unit 303, for example. The second application program is, for example, downloaded by the controller 310 from a server on the World Wide Web via the wireless communication unit 314 and stored in the non-volatile storage unit 316.

Note that, an application program and a functional element achieved by execution of an application program may also be referred to as an "application" or an "app" hereinafter.

The OS 344 is achieved by execution of an OS program previously stored in, for example, the non-volatile storage unit 316 by the controller 310. The OS 344 includes a device driver configured to operate various devices including the nine-axis sensor 301, the display unit 303, and the communication I/F unit 318 provided in the personal digital assistant 300. The OS 344 provides various application programming interfaces (APIs) to an application such as the application unit 330. The API is generally a software function that executes predetermined processing by providing a command code and an argument and returns data and a status according to the command code and the argument as a response. Note that, "instruct the OS 344" or "set via the OS 344" may be achieved by, for example, calling the corresponding API for performing the instruction or the setting, or setting a corresponding parameter in the OS 344.

The first application program for achieving the above-described UI output unit 338 and the second application program for achieving the application unit 330 are executed on the OS 344.

The connection detector 332 acquires status information about the communication I/F unit 318 via, for example, the OS 344, detects that an external display device has been connected to the personal digital assistant 300, and transmits a notification that the display device has been connected to the image output unit 334 and the UI output unit 338. The external display device is the HMD 100 in the exemplary embodiment.

The connection detector 332 also acquires model information about the display device connected to the personal digital assistant 300 from the status acquired from the communication I/F unit 318, and transmits the model information to the display size instructing unit 336.

Furthermore, the connection detector 332 acquires the status information about the communication I/F unit 318, detects that the connection between the personal digital assistant 300 and the external display device has been canceled, and transmits a notification that the connection to the display device has been canceled to the image output unit 334 and the UI output unit 338.

The image output unit 334 outputs an image displayed on the display unit 303 to the HMD 100 by a mirroring function of the OS 344 in response to connection of, for example, the HMD 100 as the external display device. Herein, the image displayed on the display unit 303 is an image generated by the OS 344 or an image generated by the application unit 330 (that is, by execution of the second application program in the controller 310).

Specifically, the image output unit 334 instructs the OS 344 to designate a foreground image that is currently being displayed on the display unit 303 and output the foreground image to the HMD 100 as the external display device by the mirroring function.

The image output unit 334 instructs the OS 344 to receive an instruction (image size instruction) about size of an image to be output to the HMD 100 and output an image in accordance with the received image size instruction to the HMD 100.

The display size instructing unit 336 transmits, to the image output unit 334, an instruction (image size instruction) about size of an image to be output to the display device connected to the personal digital assistant 300 in such a way that an image having a size suitable for the display region of the display device is displayed on the display device. The non-volatile storage unit 316 previously stores, as size information, designation of image size suitable for display devices of various models connected to the personal digital assistant 300, which needs to be set for the display devices.

The display size instructing unit 336 refers to the size information based on model information about the display device transmitted from the connection detector 332, and identifies the image size suitable for the connected display device. Then, the display size instructing unit 336 generates an image size instruction based on the identified image size, and transmits the image size instruction to the image output unit 334.

In the exemplary embodiment, the size information and the display size instruction particularly include information (aspect ratio information) about an aspect ratio of an image suitable to be displayed on a display device of a certain model and an instruction (aspect ratio instruction) of the aspect ratio, respectively. The aspect ratio information and the aspect ratio instruction may have a value indicating whether an image to be displayed needs to be a vertically oriented portrait or a horizontally oriented landscape.

For example, the designation of image size including aspect ratio information in which a horizontally oriented landscape image is designated as image size suitable for a horizontally oriented display region 402 (FIG. 5) of the HMD 100 is associated with a model of the HMD 100 and stored in the size information. Note that, the size information and the image size instruction may include instructions of size of an image and a display position of an image in a display region of a display device in addition to an aspect ratio. The aspect ratio may indicate a ratio of display resolution in vertical and horizontal directions of an image in addition to directly indicating a ratio of vertical and horizontal size of the image. The size of the image may indicate display resolution in vertical and horizontal directions in addition to directly indicating size of the image. In this respect, the image size instruction including the aspect ratio and/or the size of the image corresponds to an instruction of display resolution.

The display size instructing unit 336 refers to the size information based on the model information about the HMD 100 transmitted from the connection detector 332 when the HMD 100 is connected to the personal digital assistant 300. Then, the display size instructing unit 336 identifies image size including aspect ratio information in which a horizontally oriented landscape image suitable for the HMD 100 is instructed from the size information. The display size instructing unit 336 generates an image size instruction including an aspect ratio instruction instructing a landscape image based on the identified image size, and transmits the image size instruction to the image output unit 334.

As described above, the image output unit 334 instructs the OS 344 to output an image in accordance with the received image size instruction to the HMD 100. In this way, the image displayed on the HMD 100 by the mirroring function is a landscape image suitable for the horizontally oriented display region of the HMD 100.

Instead, the image size information may be acquired by the image output unit 334 from the Internet, based on recognizable information such as a name, a nickname, and an abbreviation of the display device connected to the personal digital assistant 300. Specifically, recognizable information such as a name of the display device connected to the personal digital assistant 300 is assumed to be input from the communication I/F unit 318 or the display unit 303.

Then, the image output unit 334 may acquire information about the display resolution of a display device corresponding to the name from the Internet via the wireless communication unit 314 based on the name, and generate an image size instruction.

Figure 3:
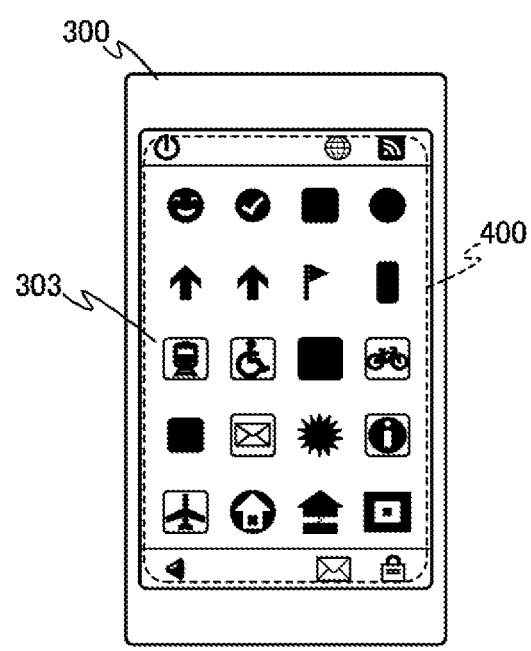
FIG. 3 is a diagram illustrating one example of an image displayed on the personal digital assistant.
Figure 4:
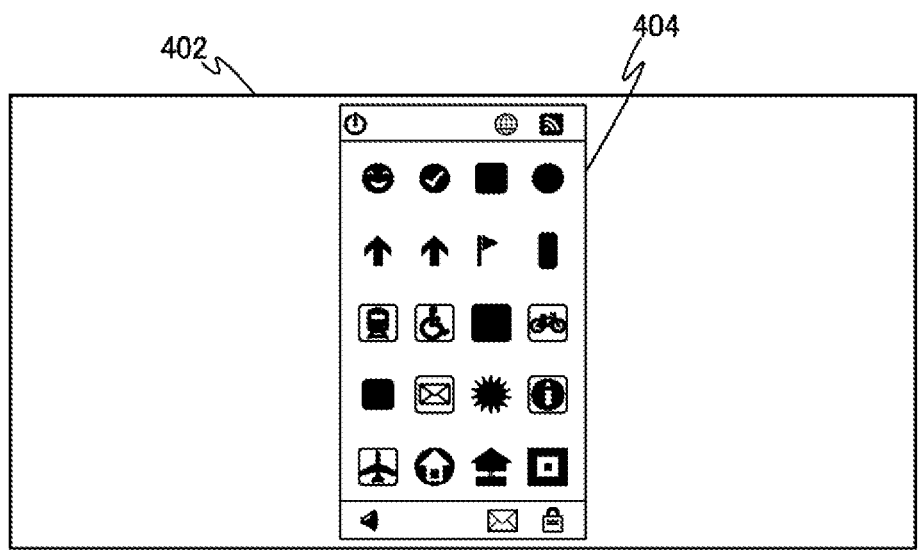
FIG. 4 is a diagram illustrating one example of an image displayed on the HMD by a known mirroring function.

FIG. 3 illustrates an image 400 of a menu displayed on the display unit 303 by, for example, the OS 344 in the personal digital assistant 300. In the illustrated example, a direction of the displayed image 400 is a vertically oriented portrait. In this case, when the HMD 100 is connected to the personal digital assistant 300, the image output unit 334 displays an image on the HMD 100 based on the image 400 on the display unit 303 by using the mirroring function of the OS 344. Herein, assuming that the image output unit 334 displays the image 400 illustrated in FIG. 3 on the HMD 100 without change similarly to a known personal digital assistant, a user of the HMD 100 sees the image as illustrated in FIG. 4 in the display region of the HMD 100.

In other words, in known image display by the mirroring function, an image 404 identical to the vertically oriented image 400 on the display unit 303 of the personal digital assistant 300 is displayed around, for example, the center of a horizontally oriented display region 402 on the HMD 100. In this case, as illustrated, only a part of the center of the display region 402 of the HMD 100 is actually used for the image display, which results in inefficient display in terms of the usage efficiency of the display region 402.

On the other hand, since the display size instructing unit 336 transmits an image size instruction to cause the image output unit 334 to output an image at an aspect ratio suitable for the display region 402 of the HMD 100 in the personal digital assistant 300 of the invention, the usage efficiency of the display region 402 can be improved.

Figure 5:
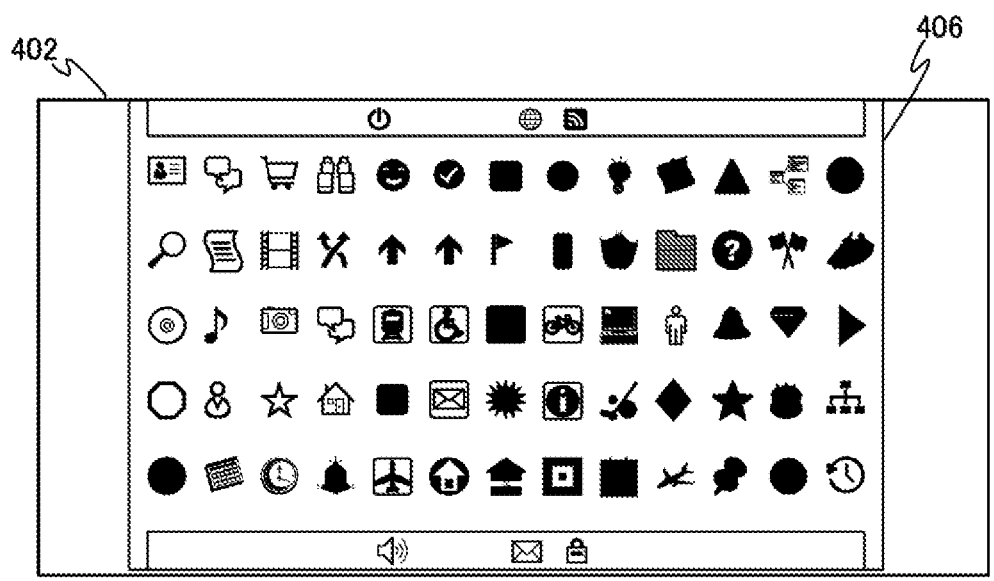
FIG. 5 is a diagram illustrating one example of an image displayed on the HMD by the personal digital assistant.

FIG. 5 illustrates an example of an image displayed on the HMD 100 by the mirroring function when the personal digital assistant 300 according to the invention is used. In the illustrated example, a menu image generated by the OS 344 is displayed as an image 406 being a horizontally oriented landscape in the horizontally oriented display region 402 of the HMD 100 by the mirroring function.

In the illustrated example, the displayed menu image is generated from the OS 344. When the image output unit 334 designates a landscape image from the OS 344 based on an image size instruction, the OS 344 may generate a menu image suitable for the landscape image and output the menu image to the display unit 303. As a result, the image displayed on the HMD 100 also becomes a menu image suitable for the landscape image generated by the OS 344. The image 406 illustrated in FIG. 5 is an example of the menu image suitable for the landscape image generated by the OS 344. As an example, the image 406 is the image 400 illustrated in FIG. 3 added on the right and left with image parts to be displayed by turning pages of the image 400 in a right-and-left direction.

Note that, an image displayed on the display unit 303 may not be generated by the OS 344, and may be displayed by an application executed on the OS 344, for example, the application unit 330. Such an application executed on the OS 344 normally reads designation of a portrait image or a landscape image from the OS 344 and outputs the designation to the display unit 303. Therefore, even with an image generated by the application unit 330, a landscape image generated by the application unit 330 may be output to the display unit 303 in a case where the image output unit 334 designates a landscape image from the OS 344. As a result, the image displayed on the HMD 100 also becomes a landscape image suitable for the HMD 100.

Referring back to FIG. 2, the UI output unit 338 switches the image displayed on the display unit 303 to display of a user interface for instructing execution of processing related to the image in response to the connection of the HMD 100 via the communication cable 42 and the connector 304. At this time, the display of the user interface is performed by setting a brightness value of the display unit 303 to a default brightness value Id. Hereinafter, a user interface is also simply referred to as a UI.

Herein, the default brightness value Id being a predetermined brightness value may be set to a fixed value indicating a ratio of brightness to predetermined maximum brightness of 100%, 75%, and the like, for example. Alternatively, the default brightness value Id may be a set value of a ratio of brightness that has been predetermined by a user and stored in the non-volatile storage unit 316.

Switching to the display of the UI is performed by setting an image that has been displayed on the display unit 303 as a background image and setting an image including the UI in the foreground to display the images on the display unit 303. In this case, the image that has been displayed continues to be output virtually as a background image to the display unit 303, and thus the image continues to be output to the HMD 100 by the mirroring function. The reason is that a target of image output by a mirroring function of an OS does not generally change as long as a set value of a parameter is changed in the OS that designates a mirroring target image.

Specifically, when the HMD 100 is connected to the personal digital assistant 300, the UI output unit 338 instructs the OS 344 to set an image that has been displayed on the display unit 303 as a background image. The UI output unit 338 creates a UI display screen that displays one UI (default UI) among a plurality of predefined different UIs. Then, the UI output unit 338 instructs the OS 344 to set the created UI display screen as a foreground image and display it on the display unit 303. At this time, the UI output unit 338 instructs the OS 344 to set display brightness of the UI display screen as a default brightness value Id. In this way, the display screen of the default UI is displayed at the default brightness value Id on the display unit 303.

Note that, examples of the plurality of predefined different UIs include a keyboard UI used to input text while displaying a software keyboard and/or a video reproduction UI used to input an instruction of video reproduction. Examples of the UIs may include a track pad UI that displays a pad and acquires coordinates of a touch position of a finger on the touch sensor 322 and/or a cross key UI that displays a cross key and acquires an input of increase or decrease of a coordinate value of cursor coordinates on the display panel 320.

Instead of a UI provided by the OS 344 that generates an image displayed on the HMD 100 or the application unit 330, these UIs instruct execution of processing related to the image. Specifically, the UI output unit 338 inputs, to the application unit 330 achieved by the OS 344 and/or the second application program via the OS 344, input information being input from a user via the UI displayed on the display unit 303. More specifically, an operation of substituting the UI displayed on the display unit 303 by the UI output unit 338 for the UI provided by the OS 344 or the application unit 330 is performed as follows, for example.

An OS provided in a personal digital assistant such as a smartphone generally includes standard APIs for standard operations of inputting text, controlling start, stop, and fast-forward of video reproduction, acquiring coordinates of a touch position on the touch sensor 322, and increasing or decreasing cursor coordinates. The OS 344 and the application unit 330 display the UIs for text input and video reproduction control on the display unit 303, which are needed to control operations of menu display and video reproduction (moving image reproduction) executed by each of the OS 344 and the application unit 330. When the UIs are operated, the OS 344 and the application unit 330 then call the corresponding standard API provided by the OS 344 for text input and video reproduction control. The called standard API stores data indicating input text and instructions of start of moving image reproduction in each corresponding buffer (for example, a storage region of a specific address in the non-volatile storage unit 316) provided by the OS 344, for example. Examples of the buffers may include a text buffer, a command buffer for video reproduction control, a touch coordinate buffer, and/or a cursor coordinate buffer. The OS 344 and the application unit 330 read data from the buffers to acquire text and instructions input by operation of the UIs by a user.

On the other hand, when being operated by a user, the UI such as the keyboard UI displayed on the display unit 303 by the UI output unit 338 and the video reproduction UI calls the corresponding standard API, instead of the OS 344 and/or the application unit 330. The called standard API stores data corresponding to the operation in the text buffer, the command buffer for the video reproduction control, or the like in the OS 344, similarly to that described above. In this way, the OS 344 or the application unit 330 can acquire input from a user via the UI displayed on the display unit 303 by the UI output unit 338. In other words, the UI provided by the OS 344 or the application unit 330 is substituted by the UI displayed on the display unit 303 by the UI output unit 338.

The UI output unit 338 causes the display unit 303 to display selection operation elements for a user to select any of the plurality of predefined UIs as a part of the UI display screen that displays the UI in response to connection of the HMD 100 to the personal digital assistant 300. Then, the UI output unit 338 switches the image displayed on the display unit 303 to display of one corresponding UI by using the default brightness value Id in response to the user operation on the selection operation elements.

The selection operation elements may be buttons, tabs, and the like displayed on the display unit 303. In this way, the user can switch, for example, display of a default UI displayed on the display unit 303 to display of another appropriate UI.

Furthermore, when causing the display unit 303 to display the UI, the UI output unit 338 always causes the display unit 303 to display a predetermined identification display 508 for the camera image recognition unit 342 to determine whether the display unit 303 falls within a visual field range of the user of the HMD 100. Operations of the camera image recognition unit 342 will be described later.

Figure 6:
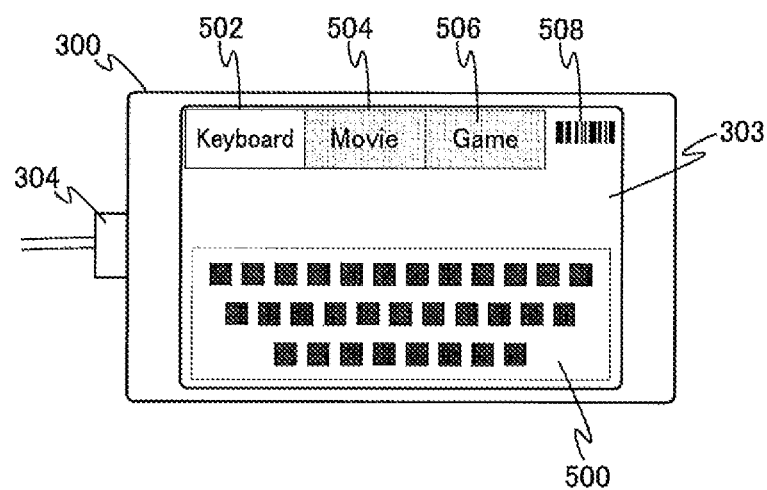
FIG. 6 is a diagram illustrating one example of a display screen of a user interface displayed by the personal digital assistant.

FIG. 6 is a diagram illustrating one example of a UI display screen displayed on the display unit 303 by the UI output unit 338 when a notification that the display device has been connected is received from the connection detector 332. In the illustrated example, for example, buttons 502, 504, and 506 as selection operation elements are displayed together with a keyboard UI 500 as a default user interface. The button 502 that says "Keyboard" is a selection operation element corresponding to the keyboard UI 500 that is currently being displayed on the display unit 303. The button 504 that says "Movie" and the button 506 that says "Game" are selection operation elements corresponding to a video reproduction UI and a game UI, respectively, as other user interfaces that are not being displayed on the display unit 303. In addition, the identification display 508 displayed on the display unit 303 is, for example, a specific bar code in FIGS. 6 to 8.

In the example of FIG. 6, since the buttons 504 and 506 are the selection operation elements corresponding to the user interfaces that are not being displayed on the display unit 303, the buttons 504 and 506 are displayed at a lower degree of brightness than that of the button 502 corresponding to the user interface being displayed on the display unit 303. This indicates that the button 504 and the button 506 are the selection operation elements corresponding to the user interfaces that are not being displayed on the display unit 303.

Figure 7:
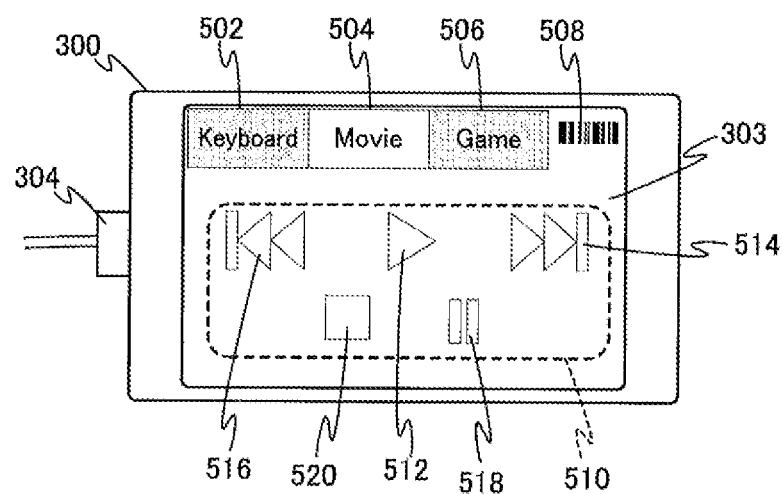
FIG. 7 is a diagram illustrating another example of a display screen of a user interface displayed by the personal digital assistant.

When the user performs an operation on the screen illustrated in FIG. 6 by, for example, touching the button 504 as the selection operation element, the UI output unit 338 causes the display unit 303 to display a video reproduction UI 510 corresponding to the button 504 in response to the operation, as illustrated in FIG. 7.

In the example illustrated in FIG. 7, the video reproduction UI 510 corresponding to the button 504 includes a reproduction button 512, a fast-forward button 514, a fast-rewind button 516, a pause button 518, and a stop button 520. The display unit 303 displays the button 504 corresponding to the video reproduction UI 510 that is currently being displayed at a higher degree of brightness than that of the buttons 502 and 506 corresponding to the user interfaces that are currently not being displayed.

Figure 8:
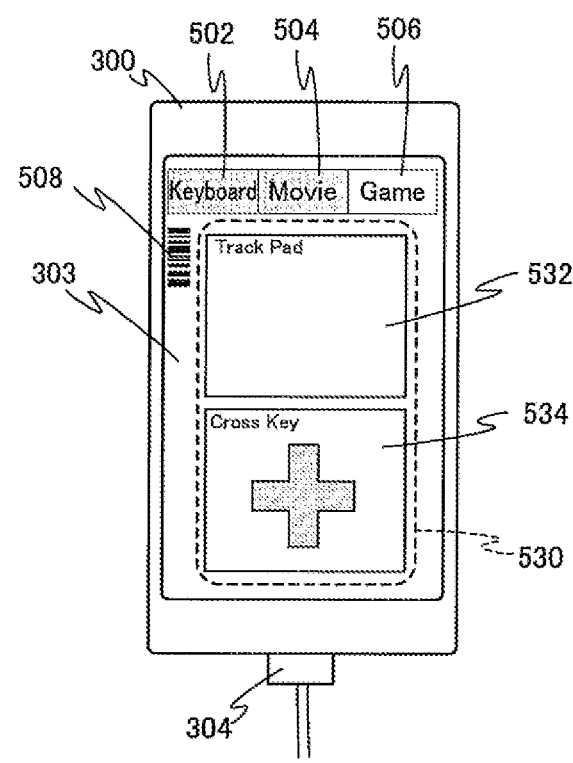
FIG. 8 is a diagram illustrating still another example of a display screen of a user interface displayed by the personal digital assistant.

On the other hand, when the user performs an operation on the screen illustrated in FIG. 6 or the screen illustrated in FIG. 7 by, for example, touching the button 506, the UI output unit 338 causes the display unit 303 to display a game UI 530 corresponding to the button 506 in response to the operation, as illustrated in FIG. 8.

In the example illustrated in FIG. 8, the game UI 530 includes a track pad UI 532 and a cross key UI 534. The display unit 303 displays the button 506 corresponding to the game UI 530 that is currently being displayed at a higher degree of brightness than that of the buttons 502 and 504 corresponding to the user interfaces that are currently not being displayed.

Note that, in the examples of FIGS. 6 to 8, a button (namely, a selection operation element) corresponding to a user interface displayed on the display unit 303 and a button corresponding to a user interface that is not being displayed vary in display brightness of the button to be distinguished from one another. However, the invention is not limited to the way of the distinction. A button corresponding to a user interface displayed on the display unit 303 and a button corresponding to a user interface that is not being displayed on the display unit 303 may vary in display color of the button to be distinguished from one another and displayed.

In the exemplary embodiment, the UI output unit 338 causes the display unit 303 to display a display screen of a UI corresponding to a button by an operation on the button 504 and the like by a user, but the invention is not limited to this. For example, when the application unit 330 outputs the image displayed on the display unit 303 to the HMD 100, the UI output unit 338 may cause the display unit 303 to display a UI according to a type of the second application program that achieves the application unit 330. Specifically, the UI output unit 338 first acquires information about a type of the second application program from the second application program (that is, the application unit 330). Then, the UI output unit 338 switches the image displayed on the display unit 303 to display of the UI according to the type of the second application program.

Referring back to FIG. 2, after the UI output unit 338 causes the display unit 303 to display any of the UIs, the display brightness setting unit 340 of the UI output unit 338 measures elapsed time without operation on the displayed UI. Then, when the UI displayed on the display unit 303 has not been operated for a predetermined period of time or longer, the display brightness setting unit 340 sets brightness of the display unit 303 to a value smaller than the default brightness value Id or to zero. Specifically, the display brightness setting unit 340 instructs the OS 344 to set a display brightness value of a UI display screen that is currently being set as a foreground image of the display unit 303 to a predetermined value Ids smaller than the default brightness value Id or to zero. This can reduce power consumption of the personal digital assistant 300 while a UI is not being used. Note that, determination of whether a UI is operated may be performed by, for example, determining whether the touch sensor 322 has detected a touch with a finger of a user on any place on the display panel 320.

The display brightness setting unit 340 determines whether the personal digital assistant 300 is shaken by a user, based on sensor data acquired from the nine-axis sensor 301 that functions as an acceleration sensor. When the personal digital assistant 300 is shaken, the display brightness setting unit 340 sets brightness of the display unit 303 to the predetermined default brightness value Id and displays the UI. In this way, the user can cause the UI on the display unit 303 to be brightly displayed at the default brightness value Id by shaking the personal digital assistant 300 when, for example, the display brightness of the display unit 303 becomes less than or equal to the default brightness value Id and is hardly visually recognized. Note that, shake of the personal digital assistant 300 by a user can be detected from a change in an acceleration applied to the personal digital assistant 300, which is indicated by the sensor data acquired from the nine-axis sensor 301. For example, when the display brightness setting unit 340 detects a change in the acceleration at intervals in a predetermined range, at an amplitude having a predetermined value or greater, and/or for the number of times greater than or equal to a predetermined number of times, the display brightness setting unit 340 can determine that the personal digital assistant 300 is shaken by a user.

Instead or in addition, the display brightness setting unit 340 determines whether it has been detected that the display unit 303 of the personal digital assistant 300 is directed in the direction opposite to the gravitational direction, based on sensor data acquired from the nine-axis sensor 301 that also functions as an attitude sensor. When the display unit 303 is directed in the direction opposite to the gravitational direction, the display brightness setting unit 340 sets brightness of the display unit 303 to the default brightness value Id and displays the UI. In this way, the user can cause the UI on the display unit 303 to be displayed at the default brightness value Id by directing the display unit 303 of the personal digital assistant 300 in the opposite "upward" direction to the gravitational direction when, for example, the display brightness of the display unit 303 becomes less than or equal to the default brightness value Id.

When the display unit 303 does not fall within the visual field range of a user of the HMD 100, the display brightness setting unit 340 sets the display brightness of the UI on the display unit 303 to be smaller than the default brightness value Id. Specifically, when the display unit 303 does not fall within the visual field range of a user of the HMD 100, an out-visual field notification is transmitted from the camera image recognition unit 342 to the display brightness setting unit 340. When receiving the out-visual field notification, the display brightness setting unit 340 instructs the OS 344 to set the display brightness of the UI on the display unit 303 to a value smaller than the predetermined default brightness value Id or to zero. This can prevent unnecessary power consumption by reducing the brightness of the display unit 303 when the user does not keep the display unit 303 within the visual field range and thus the UI on the display unit 303 is less likely to be used.

When the display unit 303 falls within the visual field range of a user of the HMD 100, the display brightness setting unit 340 sets the display brightness of the UI on the display unit 303 to the default brightness value Id. Specifically, as described later, when the display unit 303 falls within the visual field range of a user of the HMD 100, an in-visual field notification is transmitted from the camera image recognition unit 342 to the display brightness setting unit 340. When receiving the in-visual field notification from the camera image recognition unit 342, the display brightness setting unit 340 sets the display brightness of the display unit 303 to the predetermined default brightness value Id. In this way, the user can cause the UI on the display unit 303 to be brightly displayed at the default brightness value Id by keeping the display unit 303 within the visual field range when the user is to operate the UI on the display unit 303.

In addition, when the display unit 303 falls within the visual field range of a user of the HMD 100, brightness of an image to be displayed on the HMD 100 may be reduced or set to zero. Specifically, the camera image recognition unit 342 also transmits the in-visual field notification to the image output unit 334. Then, when receiving the in-visual field notification, the image output unit 334 instructs the OS 344 to set brightness of an image output to the HMD 100, that is, a brightness value of an image set as a background image of the display unit 303 by subtracting a predetermined value, or set the brightness to zero. In this way, when the user keeps the display unit 303 within the visual field range, the user can more clearly visually recognize the UI on the display unit 303 visually recognized through the image display on the HMD 100. Note that, when the image output unit 334 then receives the out-visual field notification from the camera image recognition unit 342, the image output unit 334 sets a brightness value of the image set as the background image of the display unit 303 to the value before the subtraction. In this way, when the user keeps the display unit 303 out of the visual field range, the user can clearly see the image on the HMD 100 at original brightness.

The camera image recognition unit 342 acquires an image captured by the camera 61 provided in the HMD 100 via the communication I/F unit 318, and determines whether the display unit 303 falls within the visual field range of the user wearing the HMD 100. The determination can be performed by determining whether the identification display 508 displayed on the display unit 303 by the UI output unit 338 is found in the image captured by the camera 61.

When the identification display 508 is found in the captured image of the camera 61, the camera image recognition unit 342 determines that the display unit 303 falls within the visual field range of the user. Then, the camera image recognition unit 342 transmits a notification (in-visual field notification) that the display unit 303 is determined to fall within the visual field range of the user to the display brightness setting unit 340.

When the identification display 508 is not found in the captured image of the camera 61, the camera image recognition unit 342 transmits a notification (out-visual field notification) that the display unit 303 is determined not to fall within the visual field range of the user of the HMD 100 to the display brightness setting unit 340. Note that, as described above, the camera image recognition unit 342 may transmit the in-visual field notification and the out-visual field notification to the display brightness setting unit 340 as well as the image output unit 334.

In the exemplary embodiment, the identification display 508 is a bar code, but the invention is not limited to this. The identification display 508 may be display including any shape, brightness, color, or a change in them that may be recognized as the identification display 508 in the image of the camera 61. For example, the identification display 508 may be display having a simple shape such as a triangle that blinks or change in color at predetermined time intervals.

As described above, the personal digital assistant 300 in the exemplary embodiment as a processing device includes the display unit 303 configured to display an image and the connection detector 332 configured to detect that the HMD 100 as an external display device has been connected. The personal digital assistant 300 further includes the image output unit 334 configured to output the image displayed on the display unit 303 to the HMD 100 in response to the connection of the HMD 100. The personal digital assistant 300 further includes the user interface output unit configured to switch the image displayed on the display unit 303 to display of a user interface for instructing execution of processing related to the output image to the HMD 100 in response to the connection of the HMD 100. Then, the display of the user interface is performed at a predetermined default brightness value Id.

The personal digital assistant 300, the display system 1, and the first application program in the invention can facilitate an input operation of a user by, for example, enlarging and displaying a UI on the display unit 303 when an image is displayed on the HMD 100. As a result, the usability of cooperative operation between the personal digital assistant 300 and the HMD 100 is improved in terms of operability.

In the personal digital assistant 300 in the invention, the user interface output unit 338 sets brightness of the display unit 303 to a value smaller than the predetermined default brightness value Id or to zero when the user interface displayed on the display unit 303 has not been operated for a predetermined period of time or longer. In this way, power consumption of the personal digital assistant 300 can be reduced by reducing power consumed in the display unit 303 when the user interface displayed on the display unit 303 does not need to be operated and a user does not need to visually recognize the display unit. As a result, the usability of cooperative operation between the personal digital assistant 300 and the HMD 100 is also improved in terms of operation cost.

The personal digital assistant 300 in the invention further includes the nine-axis sensor 301 that functions as an acceleration sensor. The user interface output unit 338 sets brightness of the display unit 303 to the predetermined default brightness value Id when the nine-axis sensor 301 has detected shake of the personal digital assistant 300. In this way, the user can cause the UI on the display unit 303 to be brightly displayed by shaking the personal digital assistant 300 when the display brightness of the display unit 303 is set to be low and the UI is hardly visually recognized. As a result, the usability of cooperative operation between the personal digital assistant 300 and the HMD 100 is further improved in terms of operability.

The personal digital assistant 300 in the invention further includes the nine-axis sensor 301 that also functions as an attitude sensor. The user interface output unit 338 sets brightness of the display unit 303 to the predetermined default brightness value Id when the nine-axis sensor 301 has detected that the display unit 303 of the personal digital assistant 300 is directed in a direction opposite to a gravitational direction. In this way, the user can cause the UI on the display unit 303 to be brightly displayed by directing the display unit 303 in an opposite "upward" direction to the gravitational direction when the display brightness of the display unit 303 is set to be low and the UI is hardly visually recognized. As a result, the usability of cooperative operation between the personal digital assistant 300 and the HMD 100 is further improved in terms of operability.

In the personal digital assistant 300 in the invention, the user interface output unit 338 causes the display unit 303 to display selection operation elements for a user to select any of predetermined user interfaces in response to connection of the HMD 100. The selection operation elements are the button 502 and the like in the personal digital assistant 300. Then, the user interface output unit 338 switches the image displayed on the display unit 303 to display of one corresponding UI in response to a user operation on the button 502 and the like. In this way, the user can cause the display unit 303 of the personal digital assistant 300 to display an appropriate user interface according to an image displayed on the HMD 100. As a result, the usability of cooperative operation between the personal digital assistant 300 and the HMD 100 is further improved in terms of operability.

The personal digital assistant 300 in the invention further includes the display size instructing unit 336 configured to give, to the image output unit 334, an aspect ratio instruction as an instruction of an aspect ratio of an image output to the HMD 100. In this way, an image having an aspect ratio suitable for the HMD 100 can be displayed on the HMD 100, and thus usage efficiency of a display region in the HMD 100 can be improved. As a result, the usability of cooperative operation between the personal digital assistant 300 and the HMD 100 may also be improved in terms of an amount of information that may be provided to a user.

The personal digital assistant 300 in the invention further includes the controller 310 as an arithmetic unit, and the user interface output unit 338 is achieved by execution of the first application program in the controller 310. In this way, the usability of cooperative operation between the personal digital assistant 300 and the HMD 100 can be easily improved by simply executing the application program without rebuilding the operating system.

In the personal digital assistant 300 in the invention, the image displayed on the display unit 303 and output to the HMD 100 is generated by, for example, execution of the second application program in the controller 310. The user interface output unit 338 first acquires information about a type of the second application program from the second application program.

Then, the user interface output unit 338 switches the image displayed on the display unit 303 to display of the user interface according to the type of the second application program. In this way, the personal digital assistant 300 causes the display unit 303 to automatically display an appropriate user interface according to an image displayed on the HMD 100, and thus the usability of cooperative operation between the personal digital assistant 300 and the HMD 100 is further improved in terms of operability.

In the personal digital assistant 300 in the invention, the controller 310 executes the first application program and the second application program on the operating system 344. Then, the user interface output unit 338 inputs, to the second application program via the operating system 344, input information being input from a user via the user interface displayed on the display unit 303. In this way, the user interface output unit 338 can appropriately pass information about a user operation on the user interface displayed on the display unit 303 to a program that provides an image output to the HMD 100 without specifying a destination to which the information is delivered. Therefore, this suppresses an increase in processing load on the controller 310 due to the user interface output unit 338, and the usability of cooperative operation between the personal digital assistant 300 and the HMD 100 is improved in terms of smoothness.

In the personal digital assistant 300 in the invention, the HMD 100 includes the display region 402 in which an external scene is visually recognizable and superimposes an image on an external scene and displays the image in front of a line of sight of a user in the display region 402 when the HMD 100 is worn by the user on a head. The HMD 100 further includes the camera 61 configured to capture an external scene. The user interface output unit 338 determines whether the display unit 303 falls within a visual field range of a user, based on a captured image of an external scene acquired from the camera 61 provided in the HMD 100. Then, the user interface output unit 338 sets display brightness of the display unit 303 to a value smaller than the predetermined default brightness value Id or to zero when the display unit 303 is determined not to fall within the visual field range of the user. In this way, unnecessary power consumption of the personal digital assistant 300 can be avoided by reducing brightness of the display unit 303 when the display unit 303 does not fall within the visual field range of the user and thus the user interface on the display unit 303 is less likely to be operated. As a result, the usability of cooperative operation between the HMD 100 and the personal digital assistant 300 can be improved in terms of operation cost.

In the personal digital assistant 300 in the invention, the user interface output unit 338 sets brightness of an image output to the display unit 303 to the predetermined default brightness value Id when the display unit 303 is determined to fall within the visual field range of the user of the HMD 100. This determination is performed based on a captured image of an external scene acquired from the camera 61 provided in the HMD 100, similarly to the description above. In this way, the visibility of a user interface can be improved by increasing a brightness value of the display unit 303 when the display unit 303 falls within the visual field range of the user of the HMD 100 and thus the user interface on the display unit 303 is more likely to be operated. As a result, the usability of cooperative operation between the HMD 100 and the personal digital assistant 300 can be improved in terms of operability.

In the personal digital assistant 300 in the invention, the image output unit 334 reduces brightness of an image output to the HMD 100 when the display unit 303 is determined to fall within the visual field range of the user of the HMD 100. Specifically, the image output unit 334 sets brightness of the image output to the HMD 100 to be lower than brightness when the display unit 303 does not fall within the visual field range or to zero. This determination is performed based on a captured image of an external scene acquired from the camera 61 provided in the HMD 100. In this way, brightness of an image superimposed on a screen of the display unit 303 as an external scene and displayed is reduced in the HMD 100 when the display unit 303 falls within the visual field range of the user and thus the user interface on the display unit 303 is more likely to be operated. As a result, the usability of cooperative operation between the HMD 100 and the personal digital assistant 300 can be further improved in terms of operability by further increasing the visibility of the user interface on the display unit 303.

The invention is not limited to the exemplary embodiment configured as described above. The invention can be implemented in various aspects, as long as the aspects fall within the scope of the invention.

For example, the HMD 100 does not include an OS, and the OS 344 and the UI output unit 338 are achieved in the personal digital assistant 300 in the exemplary embodiment, but the invention is not limited to this. For example, the HMD 100 may include an OS and the UI output unit 338 achieved on the OS, and, when an image is displayed on the HMD 100, the UI output unit 338 may cause a UI necessary for an operation of the image to be displayed on the personal digital assistant 300. In this case, the application unit 330 may also be achieved on the OS and provided in the HMD 100.

The configuration in which the image display unit 20 and the connection device 10 are separated and connected to each other via the connection cable 40 has been described as an example in the example embodiment, but the connection device 10 and the image display unit 20 may be connected to each other with a wireless communication line.

Such a configuration may be adopted that at least some of the elements illustrated in FIG. 2 are achieved with hardware, or achieved together with hardware and software. The invention is not limited to a configuration in which hardware resources are arranged independently as illustrated in the drawings.

The entire disclosure of Japanese Patent Application No. 2017-246914, filed Dec. 22, 2017 is expressly incorporated by reference herein.

What is claimed is:

1. A processing device comprising:
a display unit configured to display an image;
a connection detector configured to detect that a head-mounted display device has been connected;
an image output unit configured to output an image displayed on the display unit to the head-mounted display device when the connection detector detects the connection of the head-mounted display device; and
a user interface output unit configured to cause the display unit to display a display image of a user interface for instructing execution of processing related to an image output from the image output unit at a predetermined brightness value when the connection detector detects the connection of the head-mounted display device, wherein
the head-mounted display device includes a camera configured to capture an external scene, and
the user interface output unit sets display brightness of the display unit to a value smaller than the predetermined brightness value or to zero when the display unit is determined not to fall within a visual field range of a user, based on a captured image of an external scene acquired from the camera provided in the head-mounted.

2. The processing device according to claim 1, wherein the user interface output unit sets brightness of the display unit to a value smaller than the predetermined brightness value or to zero when the user interface displayed on the display unit has not been operated for a predetermined period of time or longer.

3. The processing device according to claim 1, further comprising:
an acceleration sensor, wherein
the user interface output unit sets brightness of the display unit to the predetermined brightness value when shake of the processing device has been detected by detecting a change in an acceleration of the processing device acquired from the acceleration sensor at intervals in a predetermined range, at an amplitude having a predetermined value or greater, and/or for the number of times greater than or equal to a predetermined number of times.

4. The processing device according to claim 1, further comprising:
an attitude sensor, wherein
the user interface output unit sets brightness of the display unit to the predetermined brightness value when it has been detected that the display unit of the processing device is directed in a direction opposite to a gravitational direction.

5. The processing device according to claim 1, wherein the user interface output unit causes the display unit to display selection operation elements for the user to select any of a plurality of predetermined user interfaces when the connection detector detects the connection of the head-mounted display device, and switches a display image of one corresponding user interface to a display image of the display unit in response to an operation on the selection operation elements.

6. The processing device according to claim 1, further comprising:
a display size instructing unit configured to provide an instruction of a display resolution of the image output to the head mounted display device to the image output unit.

7. The processing device according to claim 1, further comprising:
an arithmetic unit, wherein
the user interface output unit is achieved by execution of a first application program in the arithmetic unit.

8. The processing device according to claim 7, wherein the image output to the display device is generated by execution of a second application program in the arithmetic unit, and
the user interface output unit acquires information about a type of the second application program from the second application program, and switches an image displayed on the display unit to display of the user interface according to the type of the second application program.

9. The processing device according to claim 8, wherein the arithmetic unit executes the first application program and the second application program on an operating system, and
the user interface output unit inputs, to the second application program via the operating system, input information being input from the user via the user interface.

10. A display system comprising:
a processing device including
a display unit configured to display an image,
a connection detector configured to detect that a head mounted display device has been connected,
an image output unit configured to output an image displayed on the display unit to the head mounted display device when the connection detector detects the connection of the head mounted display device, and a user interface output unit configured to cause the display unit to display a display image of a user interface for instructing execution of processing related to an image output from the image output unit at a predetermined brightness value when the connection detector detects the connection of the head mounted display device; and a head mounted display device that includes a display region in which an external scene is visually recognizable and is configured to superimpose an image input from the image output unit on an external scene and display the image in front of a line of sight of a user in the display region when the head mounted display device is worn by the user on a head, wherein the head-mounted display device includes a camera configured to capture an external scene, and the user interface output unit sets display brightness of the display unit to a value smaller than the predetermined brightness value or to zero when the display unit is determined not to fall within a visual field range of the user, based on a captured image of an external scene acquired from the camera provided in the head-mounted display device.

11. The display system according to claim 10, wherein the user interface output unit sets brightness of an image output to the display unit to the predetermined brightness value when the display unit is determined to fall within a visual field range of the user, based on a captured image of an external scene acquired from the camera provided in the head mounted display device.

12. The display system according to claim 11, wherein the image output unit sets brightness of the image output to the display device to be lower than brightness when the display unit is determined not to fall within a visual field range of the user or to zero when the display unit is determined to fall within a visual field range of the user, based on a captured image of an external scene acquired from the camera provided in the head mounted display device.

13. A non-transitory computer-readable storage medium storing a program that comprising instructions to be executed by a processing device, the non-transitory computer-readable storage medium comprising:

detecting a connection between the processing device and a head mounted display device, the head-mounted display device including a camera configured to capture an external scene;

displaying a display image to a display of the processing device at a predetermined brightness value; and setting a display brightness of a display unit to a value smaller than the predetermined brightness value or to zero when the display unit is determined not to fall within a visual field range of a user, based on a captured image of an external scene acquired from the camera provided in the head-mounted display device.

* * * * *